J. H. MAYDOLE.
Curd Cutter.
No. 44,733.
Patented Oct. 18, 1864.
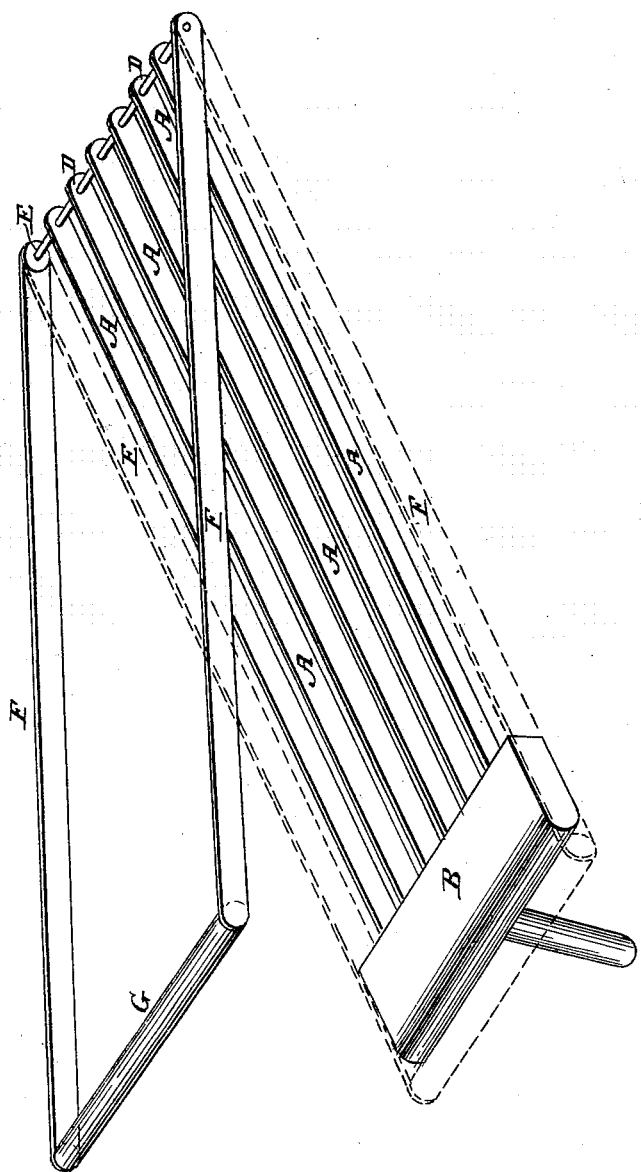
Witnesses:
C. W. Burritt
F. B. Morse
Inventor:
James H. Maydole

UNITED STATES PATENT OFFICE.

JAMES H. MAYDOLE, OF EATON, NEW YORK.

CURD-CUTTER.

Specification forming part of Letters Patent No. 44,733, dated October 18, 1864.

*To all whom it may concern:*

Be it known that I, JAMES H. MAYDOLE, of Eaton, in the county of Madison, State of New York, have invented a new and useful Improvement in Curd-Cutters; and I do hereby declare that the following is a full and exact description thereof, reference being had to the accompanying drawing, and to the letters of reference marked thereon.

The nature of my invention consists in combining with a curd-cutter one or more cutting blades, or their equivalents, in such manner that they may be held parallel with the stationary blades, or at any desired angle with said blades, the sides remaining nearly parallel, or in the same vertical plane, for the purpose, among other things, of enabling the operator to control with greater facility the movements of the implement, &c.

Prior to my invention the implement upon which I have improved consisted of one or more thin blades provided with sharp cutting-edges, from twelve to twenty inches in length, (more or less,) and a suitable handle for controlling it. Such a machine will be seen in the drawing by referring to letters A B C.

To enable others skilled in the art to make and use my invention, I will proceed to describe its construction and operation.

Through the points of the cutters I pass a rod, D. The cutters are then secured to said rod at or about equal distance from each other, generally about one-half inch. Said rod extends beyond the outer cutter a little more than one-half inch. Said rod is provided with shoulders, one of which is shown at E. To each end of said rod I attach a cutter or blade, F, in all respects like those hereinbefore described. To the upper end of said blades I attach a handle, G, the same length of the head B employed to hold the inside blades, A.

The blades F, by means of the handle G and their pivoted connection with the rod D, may be moved to any desired distance from the fixed blades A, or they may be brought into position shown by dotted lines.

Very great advantages are obtained by my improvement in controlling the movements of the curd-cutter during its operation, whereby I am enabled to perform better work with less power than by any curd-cutter known to the subscriber.

Having thus fully described my invention, what I claim as new, and desire to secure by Letters Patent, is—

Guiding and controlling the blades of a curd-cutter by the employment and use of auxiliary cutters or blades, said blades being jointed to the fixed blades at or near the points thereof, so as to enable the operator to move the opposite ends of said blades to any desired distance from each other, substantially as set forth.

JAMES H. MAYDOLE.

Witnesses:
   A. W. MORSE,
   F. B. MORSE.